(12) United States Patent  
Moisand et al.

(10) Patent No.: US 8,339,959 B1
(45) Date of Patent: Dec. 25, 2012

(54) STREAMLINED PACKET FORWARDING USING DYNAMIC FILTERS FOR ROUTING AND SECURITY IN A SHARED FORWARDING PLANE

(75) Inventors: Jerome P. Moisand, Arlington, MA (US); Jean-Marc Frailong, Los Altos, CA (US); Krishna Narayanaswamy, San Jose, CA (US); Oren Melamud, Herzelia (IL); Paul J. Kirner, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 718 days.

(21) Appl. No.: 12/182,619

(22) Filed: Jul. 30, 2008

Related U.S. Application Data

(60) Provisional application No. 61/054,692, filed on May 20, 2008.

(51) Int. Cl.
*H04L 12/26* (2006.01)
(52) U.S. Cl. ........................................ 370/235
(58) Field of Classification Search .................. None
See application file for complete search history.

(56) References Cited

U.S. PATENT DOCUMENTS

| | | | |
|---|---|---|---|
| 3,962,681 A | 6/1976 | Requa et al. | |
| 4,032,899 A | 6/1977 | Jenny et al. | |
| 4,600,319 A | 7/1986 | Everett, Jr. | |
| 5,408,539 A | 4/1995 | Finlay et al. | |
| 5,490,252 A | 2/1996 | Macera et al. | |
| 5,509,123 A | 4/1996 | Dobbins et al. | |
| 5,568,471 A | 10/1996 | Hershey et al. | |
| 6,011,795 A | 1/2000 | Varghese et al. | |
| 6,018,765 A | 1/2000 | Durana et al. | |
| 6,148,335 A | 11/2000 | Haggard et al. | |
| 6,182,146 B1 | 1/2001 | Graham-Cumming, Jr. | |
| 6,219,706 B1 | 4/2001 | Fan et al. | |
| 6,279,035 B1 | 8/2001 | Brown et al. | |
| 6,321,338 B1 | 11/2001 | Porras et al. | |
| 6,392,996 B1 | 5/2002 | Hjalmtysson | |
| 6,499,088 B1 | 12/2002 | Wexler et al. | |
| 6,563,796 B1 | 5/2003 | Saito | |

(Continued)

FOREIGN PATENT DOCUMENTS

WO 2007070838 A2 6/2007

(Continued)

OTHER PUBLICATIONS

"Well-Known TCP Port Number," www.webopedia.com, 2004, 3 pages.

(Continued)

*Primary Examiner* — Chirag Shah
*Assistant Examiner* — Minh-Trang Nguyen
(74) *Attorney, Agent, or Firm* — Shumaker & Sieffert, P.A.

(57) ABSTRACT

A network router includes a plurality of interfaces configured to send and receive packets, and a routing component comprising: (i) a routing engine that includes a control unit that executes a routing protocol to maintain routing information specifying routes through a network, and (ii) a forwarding plane configured by the routing engine to select next hops for the packets in accordance with the routing information. The forwarding plane comprises a switch fabric to forward the packets to the interfaces based on the selected next hops. The network router also includes a security plane configured to apply security functions to the packets. The security plane is integrated within the network router to share a streamlined forwarding plane of the routing component.

22 Claims, 6 Drawing Sheets

U.S. PATENT DOCUMENTS

| | | |
|---|---|---|
| 6,590,898 B1 | 7/2003 | Uzun |
| 6,594,268 B1 | 7/2003 | Aukia et al. |
| 6,598,034 B1 | 7/2003 | Kloth |
| 6,633,563 B1* | 10/2003 | Lin et al. ............. 370/389 |
| 6,735,201 B1 | 5/2004 | Mahajan et al. |
| 6,751,663 B1 | 6/2004 | Farrell et al. |
| 6,826,713 B1 | 11/2004 | Beesley et al. |
| 6,870,817 B2 | 3/2005 | Dolinar et al. |
| 6,970,943 B1 | 11/2005 | Subramanian et al. |
| 6,975,628 B2 | 12/2005 | Johnson et al. |
| 6,983,294 B2 | 1/2006 | Jones et al. |
| 6,985,956 B2 | 1/2006 | Luke et al. |
| 7,054,930 B1 | 5/2006 | Cheriton |
| 7,058,974 B1 | 6/2006 | Maher, III et al. |
| 7,099,320 B1 | 8/2006 | Salerno |
| 7,114,008 B2 | 9/2006 | Jungck et al. |
| 7,120,931 B1 | 10/2006 | Cheriton |
| 7,162,740 B2 | 1/2007 | Eastlake, III |
| 7,185,368 B2 | 2/2007 | Copeland, III |
| 7,203,740 B1 | 4/2007 | Putzolu et al. |
| 7,301,899 B2 | 11/2007 | Goldstone |
| 7,356,585 B1 | 4/2008 | Brook et al. |
| 7,362,763 B2 | 4/2008 | Wybenga et al. |
| 7,478,155 B2 | 1/2009 | Couturier et al. |
| 7,496,955 B2 | 2/2009 | Akundi et al. |
| 7,596,807 B2 | 9/2009 | Ptacek et al. |
| 7,646,771 B2 | 1/2010 | Guru et al. |
| 7,725,587 B1 | 5/2010 | Jacoby et al. |
| 7,725,934 B2 | 5/2010 | Kumar et al. |
| 7,735,116 B1 | 6/2010 | Gauvin |
| 7,810,151 B1 | 10/2010 | Guruswamy |
| 7,860,999 B1* | 12/2010 | Subramanian et al. ....... 709/238 |
| 7,937,353 B2 | 5/2011 | Bernoth et al. |
| 7,966,659 B1 | 6/2011 | Wilkinson et al. |
| 7,992,208 B2 | 8/2011 | Khandani et al. |
| 7,996,670 B1 | 8/2011 | Krishna et al. |
| 8,005,966 B2 | 8/2011 | Pandya |
| 2002/0095492 A1 | 7/2002 | Kaashoek et al. |
| 2002/0126621 A1 | 9/2002 | Johnson et al. |
| 2002/0141343 A1 | 10/2002 | Bays |
| 2003/0005145 A1 | 1/2003 | Bullard |
| 2003/0014665 A1* | 1/2003 | Anderson et al. ............. 713/201 |
| 2003/0097557 A1 | 5/2003 | Tarquini et al. |
| 2003/0110274 A1 | 6/2003 | Pazi et al. |
| 2003/0120769 A1 | 6/2003 | McCollom et al. |
| 2003/0145104 A1* | 7/2003 | Boden et al. .................. 709/238 |
| 2003/0214913 A1 | 11/2003 | Kan et al. |
| 2004/0001514 A1 | 1/2004 | Wookey et al. |
| 2004/0013119 A1 | 1/2004 | MeLampy et al. |
| 2004/0015721 A1 | 1/2004 | Eastlake, III |
| 2004/0044912 A1 | 3/2004 | Connary et al. |
| 2004/0078485 A1* | 4/2004 | Narayanan .................... 709/242 |
| 2004/0093513 A1 | 5/2004 | Cantrell et al. |
| 2004/0196843 A1 | 10/2004 | Zinin |
| 2004/0205360 A1 | 10/2004 | Norton et al. |
| 2004/0255202 A1 | 12/2004 | Wong et al. |
| 2005/0044406 A1 | 2/2005 | Stute |
| 2005/0066053 A1 | 3/2005 | McDysan |
| 2005/0102414 A1 | 5/2005 | Hares et al. |
| 2005/0111367 A1 | 5/2005 | Chao et al. |
| 2005/0114700 A1 | 5/2005 | Barrie et al. |
| 2005/0160289 A1 | 7/2005 | Shay |
| 2005/0210533 A1 | 9/2005 | Copeland et al. |
| 2005/0289219 A1 | 12/2005 | Nazzal |
| 2006/0026669 A1 | 2/2006 | Zakas |
| 2006/0089994 A1 | 4/2006 | Hayes |
| 2006/0123481 A1* | 6/2006 | Bhatnagar et al. ............. 726/24 |
| 2006/0146816 A1 | 7/2006 | Jain |
| 2006/0156403 A1 | 7/2006 | Haeffele et al. |
| 2006/0185008 A1 | 8/2006 | Le et al. |
| 2006/0195896 A1 | 8/2006 | Fulp et al. |
| 2006/0259970 A1 | 11/2006 | Sheymov et al. |
| 2007/0027992 A1 | 2/2007 | Judge et al. |
| 2007/0067438 A1 | 3/2007 | Goranson et al. |
| 2007/0121596 A1 | 5/2007 | Kurapati et al. |
| 2007/0180511 A1 | 8/2007 | Eastlake III |
| 2007/0192863 A1 | 8/2007 | Kapoor et al. |
| 2007/0239987 A1 | 10/2007 | Hoole et al. |
| 2007/0294369 A1 | 12/2007 | Ginter et al. |
| 2008/0010225 A1 | 1/2008 | Gonsalves et al. |
| 2008/0034425 A1 | 2/2008 | Overcash et al. |
| 2008/0077694 A1 | 3/2008 | Nordmark et al. |
| 2008/0127338 A1 | 5/2008 | Cho et al. |
| 2008/0168135 A1 | 7/2008 | Redlich et al. |
| 2008/0240128 A1 | 10/2008 | Elrod |
| 2008/0298392 A1 | 12/2008 | Sanchez et al. |
| 2009/0003349 A1* | 1/2009 | Havemann et al. ........... 370/392 |
| 2009/0019538 A1 | 1/2009 | Pandya |
| 2009/0126003 A1 | 5/2009 | Touboul |
| 2009/0232150 A1* | 9/2009 | Mistry .......................... 370/419 |
| 2009/0288157 A1 | 11/2009 | Pacella et al. |
| 2011/0197278 A1 | 8/2011 | Chow et al. |

FOREIGN PATENT DOCUMENTS

WO 2008070549 A2 6/2008

OTHER PUBLICATIONS

"TCP Packet Field Description," www.ipanalyser.co.uk, Analyser Sales Ltd., Copyright 2003, 2 pages.

Michael Egan, "Decomposition of a TCP Packet," www.passwall.com, 3 pages, Aug. 7, 2000.

Mark Gibbs, "A Guide to Original SYN," www.nwfusion.com, Network World, Nov. 2000, 4 pages.

"Sample TCP/IP Packet," www.passwall.com, Version 0.0.0. @ 03:55/Aug. 8, 2000, Copyright 2002, 6 pages.

D.J. Bernstein, "SYN Cookies," http://cr.yp.to/syncookies.html, Oct. 2003, 3 pages.

Stuart Staniford, et al., "Practical Automated Detection of Stealthy Portscans," http://dovvmloads.secutityfocus.com/library/spice-ces2000.pdf, 16 pages.

Weaver, A.C. et al., "A Real-Time Monitor for Token Ring Networks," Military Communications Conference, 1989. MILCOM '89, Oct. 1989, vol. 3, pp. 794-798.

Dini, P. et al., "Performance Evaluation for Distributed System Components," Proceedings pf IEEE Second International Workshop on Systems Management, Jun. 1996, pp. 20-29.

Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.

U.S. Appl. No. 10/916,021, filed Aug. 11, 2004, entitled "Stateful Firewall Protection for Control Plane Traffic Within A Network Device,".

Juniper Networks, Inc., "Combating Bots and Mitigating DDoS Attacks", Juniper Networks, Inc., 2008, entire document, http://www.juniper.net/solutions/literature/solutionbriefs/351198.pdf.

"The CAIDA Web Site," www.caida.org, 2002.

"About Endace," www.endace.com, 2002.

"Cisco IOS NetFlow," www.cisco.com/warp/public/732/Tech/nmp/netflow/index.shtml (Cisco copyright 1992-2002).

Jonathan Lemon, "Resisting SYN Flood DoS Attacks with a SYN Cache," http://people.freebsd.org/~jlemon/papers/ syncache.pdf, Nov. 14, 2001, 9 pages.

Stuart Staniford, et al., "Practical Automated Detection of Stealthy Portscans," http://downloads.securityfocus.com/library/spice-ccs2000.pdf, 2002, 16 pages.

Office Action from U.S. Appl. No. 12/476,083, dated Nov. 24, 2010, 11 pp.

Response to Office Action dated Nov. 24, 2010, from U.S. Appl. No. 12/476,083, filed Feb. 15, 2011, 10 pp.

Notice of Allowance for U.S. Appl. No. 12/476,083, mailed May 16, 2011, 11 pp.

Office Action from U.S. Appl. No. 12/209,695, dated Dec. 12, 2011, 29 pp.

Response to Office Action dated Dec. 12, 2011, from U.S. Appl. No. 12/209,695, filed Mar. 12, 2012, 24 pp.

* cited by examiner

STREAMLINED PACKET FORWARDING
USING DYNAMIC FILTERS FOR ROUTING
AND SECURITY IN A SHARED
FORWARDING PLANE

This application claims the benefit of U.S. Provisional Application No. 61/054,692, filed May 20, 2008, the entire content of which is incorporated herein by reference.

TECHNICAL FIELD

The invention relates to computer networks and, more particularly, to security and routing within computer networks.

BACKGROUND

Due to increasing reliance on network-accessible computers, network security has become a major issue for organizations and individuals. To help ensure the security of their computers, organizations and individuals frequently install security devices between public networks and their private networks. A goal of such security devices is to prevent unwanted or malicious information from the public network from affecting devices in the private network.

These security devices are commonly referred to as firewall device. Typically, the firewall is a dedicated device that is configured to permit or deny traffic flows based on an organization's security policies. Typical high-end firewalls provide packet forwarding by dynamically load-balancing packet flows to a set of service cards. These service cards provide flow-based security services, such as flow blocking, network address translation (NAT), anti-virus (AV) scanning and detection, intrusion detection protection (IDP) and/or any other security services. The firewall device typically intercepts packets entering and leaving the private network, and processes the packets with the service cards to determine whether to permit or deny the packet based on information included within each packet that may define a state of a flow associated with the packet.

Usually the firewall performs this flow-based forwarding by caching or otherwise storing flow state for the packet flows of a given communication session between two devices. Generally, upon recognizing a first packet of a new flow, the firewall initializes data to record the state data for the session. The service cards of the firewall may inspect packet flows for the sessions by performing attack detection or other intrusion detection actions. In some cases, the service cards of the firewall may comprise two forwarding paths, a first path for processing a first packet of a newly established flow and a second path for inspecting and forwarding subsequent packets associated with a pre-existing flow. The first path through the service cards may be referred to as the "first path" or "session management path." At this time, the service cards of the firewall may update flow tables to record the session and otherwise initialize session data. The second path through the service cards of the firewall may be referred to as the "fast path" because the second path normally does not take as long to traverse as the first path due to the lack of detailed inspection. In this manner, the service cards of the firewall apply the security services and provide a forwarding plane for forwarding the packets.

Some network devices attempt to combine routing functions and firewall functions within a single chassis, such as by installing one or more security service cards within a router chassis. In this type of network device, there is little integration of the routing components with the firewall components. That is, the installed security service cards apply the security services and provide their own forwarding plane for forwarding the packets. For example, incoming packets received from the network by the routing components are directed by a switch fabric of the routing components to the security services cards. The installed security service cards then process the packets with their own switch fabric forwarding plane to provide both the first path and fast path for packet flows. The service cards may then output the packets directly to the network, or may inject those packets back to the forwarding plane of the routing components for output to the network. Such a network device may experience high latency in forwarding packets due to the packets traversing switch fabric multiple times while being processed within both the security card and the routing components. As a result, it may be difficult to enforce strict quality of service (QoS), which may be problematic for applications such as Voice over Internet Protocol (VoIP) calls, video-on-demand, or multimedia. Latency may also be a concern as the volume of data traffic to be processed by such network devices increases.

SUMMARY

In general, techniques are described for streamlining routing and security functions within a shared forwarding plane of a network device. More specifically, a high-end network device is described that provides a single forwarding plane shared by a routing component and a security component to provide for streamlined packet forwarding by the network device. The forwarding plane is a rich and dynamic shared forwarding plane that accommodates processing related to pure routing as well as firewall, Network Address Translation (NAT), and deep packet inspection processing. The techniques may allow for trusted communications to bypass the security component and be processed directly by the shared forwarding plane. One result of the shared forwarding plane is that the "fast path" for flows serviced by the security functions is effectively moved from the service plane (e.g., installed service cards) to the forwarding plane of the high-end routing device. That is, initial packets for a packet flow may be directed to service cards for initial "first path" session management, but subsequent packets may utilize a "fast path" that bypasses the service cards and instead directly utilizes the forwarding plane of the high-end routing components. This streamlined data forwarding path can be used for both routing packets and for trusted communication sessions that need not be subject to deep packet inspection or other analysis by the firewall. As such, the streamlined data forwarding path, referred to herein as the "straight path," unifies the routing forwarding path and the firewall "fast path" into a single forwarding path. This may improve latency performance and the overall forwarding capacity of the network device, since fewer packets need to be processed by the security component. The single forwarding plane achieves routing, security, and quality of service treatment of packets.

The techniques of the invention allow for unification of packet filtering for routing and security processing within the network device. For example, the network device described herein may maintain a common set of filters for both routing and security packet processing. The common set of filters may include dynamic exact-match filters for zone-based firewall services. The common set of filters may also include dynamic wild-card filters and relatively static filters for routing functions.

The security plane (e.g., the set of security service planes installed within the network device) may create dynamic filters based on inspection of packet flows, and communicate with the routing component to install the dynamic filters directly into the forwarding plane of the routing component. For example, when the network device receives a packet flow, the network device accesses the common set of filters to determine whether to direct the packet flow on a "first path" through the security plane of the network device, e.g., to one or more service cards of the network device, or on the "straight path" that uses the high-end forwarding plane of the routing component so as to entirely bypass the security plane. Certain new packet flows may be sent by default onto the first path to a service card within the service plane. The service card may create a dynamic filter associated with the new packet flow and issue commands to the routing components to install the dynamic filter within the shared forwarding plane. When network device receives subsequent packets of the packet flow, the network device accesses the common set of filters and identifies the packet flow as a trusted flow based on the dynamic filter created by the service card. The streamlined forwarding path of the network device allows packets of the trusted flow to bypass the security plane of the network device and be processed directly by the shared forwarding plane. The dynamic filter may specify that certain actions are applied to the packet in the forwarding plane, such as Quality of Service (QoS) actions, marking, queuing, rate limiting, packet mirroring, routing, as well as security-oriented actions like flow blocking, Network Address Translation (NAT), sequence number adjustment, and the like.

The techniques of the invention may also allow for a number of security processes that are conventionally found within service cards of a network device to be moved from the service cards onto the routing forwarding plane of the network device. For example, in accordance with the techniques of the invention, NAT functions may be moved from the security plane to the shared forwarding plane. NAT may be performed within a forwarding component within the shared forwarding plane instead of within a service card of the security plane. As another example, sequence number adjustment actions may be performed within the forwarding plane of the network device instead of within the service cards.

The techniques of the invention may provide one or more advantages. For example, the invention may eliminate so-called U-turns by packets traversing multiple forwarding paths in the prior art, i.e., where inbound packets traversed the forwarding plane of a router to be sent to the security cards, at which point the packets traversed the separate forwarding plane of the security cards and either were output to the network or perhaps injected back to the forwarding plane of the router for output. As a result, the network device using such streamlined packet forwarding may exhibit lower latency and higher capacity than conventional network devices that attempted to combine routing and firewall functions. The lower latency may be especially beneficial for applications such as voice, video, or multimedia processing. The techniques may also allow the network device to more efficiently process a higher volume of network traffic.

In one embodiment, a method comprises receiving packets at a plurality of interfaces of a network router, wherein the plurality of interfaces are configured to send and receive packets, maintaining routing information specifying routes through a network by executing a routing protocol on a control unit of a routing engine of the router, and selecting next hops for the packets within the network with a forwarding plane configured by the routing engine. The method further comprises forwarding the packets to the interfaces in accordance with the routing information, applying security functions to the packets with a security plane of the network router, directing, with a flow control module of the forwarding plane, one or more of the received packets to the security plane for application of the security services, processing the packets with the security plane, and outputting commands with the security plane to the forwarding plane to dynamically configure the flow control module.

In another embodiment, a network router comprises a plurality of interfaces configured to send and receive packets, a routing engine comprising a control unit that executes a routing protocol to maintain routing information specifying routes through a network, a forwarding plane configured by the routing engine to select next hops for the packets in accordance with the routing information, the forwarding plane comprising a switch fabric to forward the packets to the interfaces based on the selected next hops, a security plane configured to apply security functions to the packets. The forwarding plane includes a flow control module that, upon receiving packets from the network, directs one or more of the packets to the security plane for application of the security services. The security plane processes the packets and outputs commands to the forwarding plane to dynamically configure the flow control module.

In another embodiment, a network router comprises a plurality of interfaces configured to send and receive packets, and a routing component comprising: (i) a routing engine comprising a control unit that executes a routing protocol to maintain routing information specifying routes through a network, and (ii) a forwarding plane configured by the routing engine to select next hops for the packets in accordance with the routing information. The forwarding plane comprises a switch fabric to forward the packets to the interfaces based on the selected next hops. The network router further includes a security plane configured to apply security functions to the packets, wherein the security plane is integrated within the network router to share the forwarding plane of the routing component.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
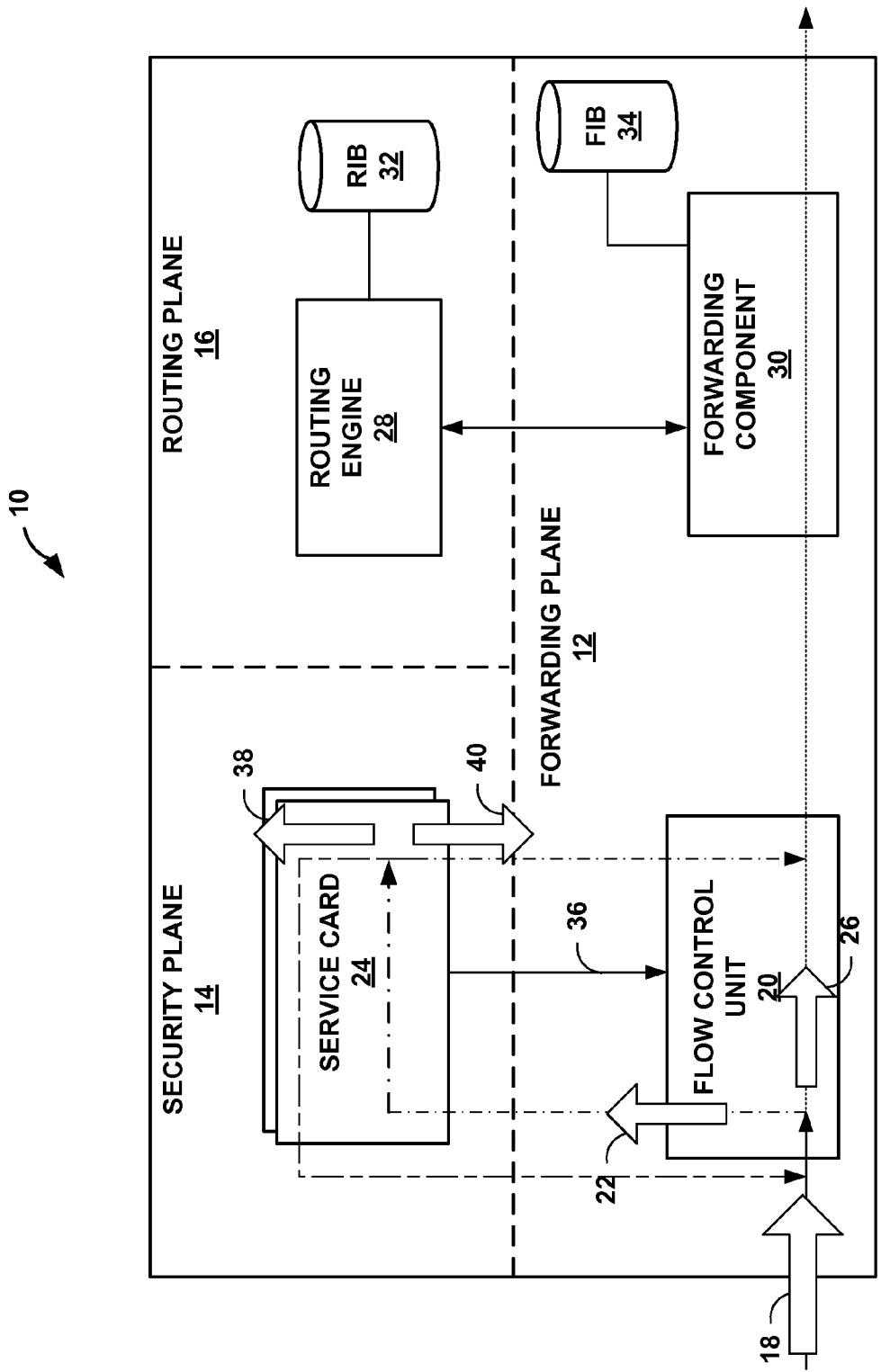
FIG. 1 is a block diagram illustrating a network device that provides a shared forwarding plane for a routing component and a security component to provide for streamlined packet forwarding in accordance with the principles of the invention.

FIG. 1 is a block diagram illustrating a network device 10 that provides a forwarding plane 12 shared by a security plane 14 and a routing plane 16 to provide for streamlined packet forwarding in accordance with the principles of the invention. Network device 10 may, for example, be a high-end router capable of deployment within a service provider network. Moreover, forwarding plane 12 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

As shown in the example embodiment of FIG. 1, network device provides a forwarding plane 12 shared by a routing component (routing plane 16) and a security component (security plane 14) to provide for streamlined packet forwarding by the network device. Forwarding plane 12 is a rich and dynamic shared forwarding plane, optionally distributed over a multi-chassis router, that accommodates processing related to pure routing as well as firewall and deep packet inspection processing. Moreover, forwarding plane 12 may be provided by dedicated forwarding integrated circuits normally associated with high-end routing components of a network router. Consequently, routing plane 16 and forwarding plane 12 operate as a high-end router, and security plane 14 has been tightly integrated within network device (e.g., by way of service cards) so as to use forwarding plane 12 of the routing components in a shared, cooperative manner.

For example, security plane 14 interacts with and configures shared forwarding plane 12 so that trusted communications (i.e., communications that have been identified by security plane 14 as originating from a trusted source) may bypass security component 14 and be processed directly by the shared forwarding plane 12. As another example, security plane 14 may dynamically reconfigure forwarding plane 12 so that the "fast path" for flows serviced by the security functions is moved from service plane 14 to shared forwarding plane 12. That is, initial packets for a packet flow may be directed to service plan 14 for initial "first path" session management, but subsequent packets for those flows may utilize a "fast path" that bypasses the service plane and instead directly utilizes forwarding plane 12 of the high-end routing components. This streamlined data path can be used for both routing packets and for trusted communication sessions that need not be subject to deep packet inspection or other analysis by security plane 14. As such, the streamlined data path 26, referred to herein as the "straight path," unifies the routing forwarding path and the firewall "fast path" into a single forwarding path that is handled directly by the high-end switch fabric of forwarding plane 12.

For example, a packet of an incoming packet flow 18 is received by network device 10, e.g., via an interface card of network device 10 (not shown), and injected into the forwarding plane 12 normally used for packet routing. As will be described in further detail below, a flow control unit 20 of forwarding plane 12 network device 10 analyzes the packet of the incoming packet flow 18 and determines based on the analysis whether to send the packet onto a "first path" 22 within network device 10 that goes through one or more service cards 24 of security plane 14 or onto a "straight path" 26 of forwarding plane 12 of network device 10 that bypasses security plane 14.

Flow control unit 20 may determine, for example, that an incoming packet is associated with a new packet flow session and, optionally, that the packet matches a default filter. Flow control unit 20 may distinguish between packet flow sessions based on a five-tuple found within a header of each received packets or other information within the packet. The five-tuple may comprise a source Internet Protocol (IP) address of the origination device, a destination IP address, a source port, a destination port, and a protocol identifier. Flow control unit 20 of forwarding plane 12 may extract the five-tuple from the packet header and attempt to look-up the five-tuple in a one or more tables of dynamic or static filters (not shown in FIG. 1) stored locally to flow control unit 20 (such as within a memory (not shown)). If the packet flow session does not match any filters within the filter tables, flow control unit 20 may by default direct the packet on the first path 22 to service cards 24 within security plane 14 for session initialization and initial security analysis. However, if the identified packet flow session matches an entry in the filter tables that specifies and existing flow or a trusted flow, flow control unit 20 may direct the packet on the straight path 26 or the first path 22 as specified by the matching filter.

As one example, default filters within the filter tables may classify packets as "first path packets" to be sent on the first path 22 based on port number, e.g., all Session Initiation Protocol (SIP) control-plane VoIP packets may be directed onto first path 22 based on identification of port number 5060 within the packet. As another example, default filters within the filter tables may classify all packets associated with a Virtual Private Network (VPN) or a given Internet Protocol (IP) subnet as trusted "straight path packets" to be sent on straight path 26, bypassing the security plane 14.

Service cards 24 within security plane 14 may be installed along a backplane or other interconnect of network device 10 to perform a variety of types of processing to packets, such as Intrusion Detection and Prevention (IDP) analysis, virus scanning, deep packet inspection, or ciphering. In some embodiments, service cards 24 may provide application layer gateway (ALG) and protocol proxy software applications, e.g., for Voice over IP (VoIP) call setup. For example, when flow control unit 20 sends the packet onto first path 22 to a service card 24, after service card 24 processes the packet, service card 24 may send the packet out onto an application-aware path 40 to forwarding plane 12. Alternatively, service card 24 may determine that the packet requires further processing at the ALG/proxy level, and may direct the packet on slow path 38 to ALG/proxy modules within the security plane 14 for further processing.

Service card 24 may issue commands 36 to request dynamic installation and removal of filters into to a flow table (not shown) within flow control unit 20 of forwarding plane 12. For example, when flow control unit 20 receives a packet and determines that the packet belongs to a new packet flow that does not match any of its filters, flow control unit 20 may send the packet on first path 22 to service card 24 for processing. Upon receiving and processing the packet, service card 24 may then issue a command 36 to install a dynamic filter within the flow table, such as an exact match filter that indicates particular actions to be performed when a packet is received that matches the filter. The exact match filter may specify that packets of this packet flow session may be processed on straight path 26. When flow control unit 20 receives a subsequent packet of the same packet flow 18, flow control unit 20 checks the flow table, determines that the packet matches the new dynamic filter, and directs the packet on the appropriate path according to the dynamic filter. When the packet is processed by forwarding component 30, forwarding component 30 may apply an appropriate action according to the dynamic filter. Exemplary actions that network device 10 may apply in forwarding plane 12 as specified by filters include rate limiting, queuing, routing, firewalling (i.e., blocking or dropping the packet), counting, network address translation (NAT), quality of service (QoS), sequence number adjustment, or other types of actions. In this manner, actions typically performed by a security device and actions typically performed by a router are combined in an integrated manner within the straight path 26 of the shared forwarding plane 12 to streamline packet forwarding in network device 10.

Any information may form the basis of differentiating between the processing paths 22 and 26. That is, filters may specify on which path to send the packet based on a protocol to which each packet conforms, a source or destination address or set of addresses, a port number or set of port numbers, a checksum calculation, or any other information contained within either a header or data portion of a packet. The invention should therefore not be strictly limited to the exemplary embodiments described herein.

Network device 10 includes a routing engine 28 that provides a routing plane 16 and a downstream forwarding component 30 within forwarding plane 12. Routing engine 28 is primarily responsible for maintaining a routing information base (RIB) 32 to reflect the current topology of a network and other network entities to which network device 10 is connected. For example, routing engine 28 provides an operating environment for execution of routing protocols that communicate with peer routers and periodically update RIB 32 to accurately reflect the topology of the network and the other network entities.

In accordance with RIB 32, forwarding component 30 maintains forwarding information base (FIB) 34 that associates network destinations with specific next hops and corresponding interface ports of output interface cards of network device 10. Routing engine 28 typically processes RIB 32 to perform route selection and generate FIB 34 based on selected routes. Routing engine 28 may generate FIB 34 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

When forwarding a packet, forwarding component 30 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface.

As described in detail, flow control unit 20 receives incoming packet flow 18 and determines whether to send the packets on the first path 22 through the security plane 14 for processing within one or more of service cards 24, or whether to bypass the security plane 14. Service cards 24 receive packets from flow control unit 20, selectively provide services to the customers in accordance with information within the packet, and relay the packet or any response packets to forwarding plane 12 for forwarding by forwarding component 30 in accordance with FIB 34.

In this manner, routing and security functions are integrated within a single network device 10 that uses a shared forwarding plane 12. By unifying the forwarding plane of the security plane and the routing plane, and by using dynamic filters within the forwarding plane, the techniques of the invention allow for streamlining the packet forwarding process. This may eliminate any unnecessary processing of packets by multiple forwarding planes and reduce so-called "U-turns" in packet forwarding. The techniques may allow network device 10 to achieve lower latency and better quality of service (QoS), which may be useful in voice, video, multimedia processing, and other applications. The techniques may also allow network device 10 to more efficiently process a higher volume of network traffic. In some embodiments, security plane 14 may use a forwarding component 30 that was previously associated only with the routing plane 16 so as to leverage the functionality of the forwarding component 30 of the routing plane 16. Operation of network device 10 will be described in further detail below with respect to FIG. 2.

A network device such as network device 10 that uses a shared forwarding plane for routing and security functions may be useful in a variety of applications. The techniques of the invention can be applied in a variety of different use cases, several of which are described in further detail below. Generally, network device 10 may be an edge device, peering device, or core device of a Service Provider (SP) network. For example, network device 10 may be an edge router that provides broadband access, such as a Broadband Remote Access Server (BRAS) or a Broadband Network Gateway (BNG) or a Cable Modem Termination System (CMTS). As another example, network device 10 may be an edge router that provides enterprise connectivity to public networks, such a Multi-Service Edge router (MSE). As another example, network device 10 may be an edge router that provides mobile access, such as a Gateway GPRS (General Packet Radio Services) Support Node (GGSN), a Packet Data Serving Node (PDSN), or a Public Data Network Gateway (PDN-GW) As a further example, network device 10 may be a data center device (e.g., and edge router) that provides routing and security functions for packets flowing in or out of a data center. As another example, network device 10 may be a peering router that serves as a point of interconnection between network service providers. As yet another example, network device 10 may be an aggregation router or core router within an IP network core of a service provider, such as a core router positioned between GGSNs or PDSNs or BNGs, etc. In addition, network device 10 may be a device associated with a private enterprise network.

Figure 2:
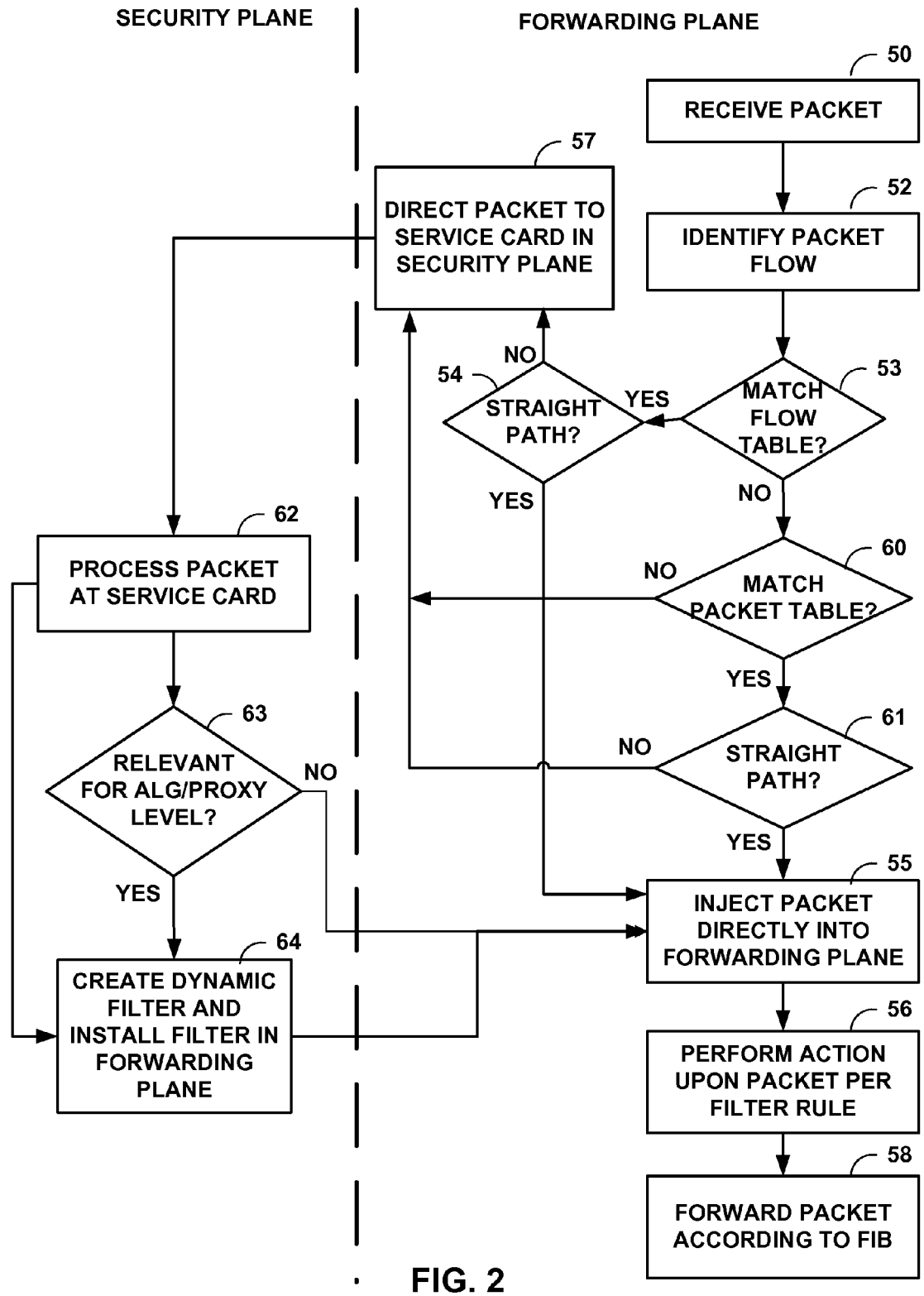
FIG. 2 is a flowchart illustrating example operation of the network device of FIG. 1 in accordance with the principles of the invention.

FIG. 2 is a flowchart illustrating example operation of network device 10 of FIG. 1 in accordance with the principles of the invention. FIG. 2 is illustrated for purposes of example showing various functions performed within the forwarding plane 12 and the security plane 14 of network device 10. Network device 10 receives a packet via incoming packet flow 18 (50). Flow control unit 20 analyzes the received packet to identify a packet flow associated with the packet (52), e.g., using a flow-based provisioning logic to identify a five-tuple based on information carried in the header or body of the packet.

Upon identifying the packet flow, flow control unit 20 references a flow table (not shown in FIG. 1) to determine whether the packet matches any filters in the flow table (53). The flow table includes a large number of dynamic exact-match filters, such as five-tuple filters. The filters may specify one or more service cards 24 to which matching packet flows should be directed, or may direct matching packet flows onto straight path 26. If flow control unit 20 finds a match in the flow table (YES branch of 53) and the matching entry directs the packet onto the straight path 26 for processing (YES branch of 54), flow control module 20 injects the packet directly into the forwarding plane of network device (55). Forwarding component 30 may perform an appropriate action on the packet per the matching filter rule (56), and in some cases the packet may be forwarded or a response packet may be sent as appropriate (58).

If the matching entry in the flow table does not direct the packet onto the straight path 26 (NO branch of 54), then flow control module 20 directs the packet onto the first path 22 to one of the service cards 24 within security plane 14 (57), as will be explained below. If flow control unit 20 does not find a match in the flow table (NO branch of 53), flow control unit 20 references a packet table (not shown in FIG. 1) to determine whether the packet matches any filters in the packet table (60). The packet table may include a large number of both static filters and dynamic filters. The packet table filters need not be exact-match filters, and may include wildcards and ranges. The filters may specify a service cards 24 to which matching packet flows should be directed, or may direct matching packet flows onto straight path 26. If flow control unit 20 finds a match in the packet table (YES branch of 60) and the matching entry directs the packet onto the straight path 26 for processing (YES branch of 61), flow control module 20 injects the packet directly into the forwarding plane of network device (55), and operation proceeds as described above.

If the packet matches a filter in the packet table (YES branch of 60), and the matching entry does not direct the packet onto straight path 26 for processing (NO branch of 61), flow control unit 20 directs the packet onto the first path 22 to a service card 24 within security plane 14 (57). The filter may specify a specific one of service cards 24 or may simply specify a default service card 24. If the packet finds no match in either the flow table or the packet table (NO branch of 60), flow control unit 20 identifies the packet flow as an unknown packet flow and may direct the packet to a service card 24 within security plane 14 for further processing (57), or may simply forward the packet (not shown). In some cases, flow control unit 20 or a master service card 24 may load balance matching packet flows across a plurality of service cards 24 within security plane 14, e.g., using a symmetric weighted hash on the source address and destination address of the packet flows.

When the packet is directed to security plane 14, the packet is processed at one of service cards 24 (62). For example, a deep packet inspection (DPI) engine of the service card 24 may perform Intrusion Detection and Prevention (IDP) analysis and/or virus scanning to filter out bad packets. As a further example, the service card 24 may perform ciphering or authentication services. As another example, the DPI engine may apply filters to match packets that should be processed at an Application Layer Gateway (ALG) or application proxy level within service card 24 (63). If no further processing is required at the ALG/proxy level (NO branch of 63), service card 24 injects the packet onto application-aware path 40, where the flow control unit 20 may apply additional actions to the packet (e.g., NAT) and/or forward the packet. For example, the packet may require network address translation (NAT) to be performed. In one embodiment, network device 10 may be configured such that per-packet NAT processing is performed within forwarding plane 12 of network device 10, instead of within security plane 14 as may be the case with conventional firewall devices.

If the DPI engine determines that the packet is relevant for processing at the ALG/proxy level (YES branch of 63), service card 24 may direct the packet on slow path 38 for additional processing. As one example, further processing may be applied by a Session Initiation Protocol (SIP) proxy module for Voice over Internet Protocol (VoIP) call setup. In some cases the DPI engine or the proxy module creates a dynamic filter associated with the packet flow and provides a command 36 to install the new dynamic filter in forwarding plane 12, i.e., within a flow table of flow control unit 20 (64). The dynamic filter may include, for example, a five-tuple that identifies the new packet flow and an action to be performed on a packet matching the five-tuple. Service card 24 may select an appropriate action for the dynamic filter (e.g., drop, forward, NAT, or QoS) based on the DPI/IDP analysis or other processing of the SIP end-to-end negotiation.

After installing the dynamic filter in the forwarding plane, service card 24 injects the packet back into the forwarding plane (55). In the forwarding plane 12, forwarding component 30 may apply actions to the packet (56) and/or forward the packet to the appropriate next hop according to FIB 34 or sends a response packet as needed (58).

When service card 24 receives a subsequent packet from the packet flow (50), upon identifying the packet flow (52) and referencing flow table, flow control unit 20 may now find a match in the flow table (YES branch of 53) and determine that the packet flow is designated for the straight path 26 (YES branch of 54), e.g., due to the presence of the new dynamic filter for the packet flow that service card 24 installed in the flow table. Upon determining that the packet flow is marked for the straight path 26, flow control unit 20 injects the packet directly into forwarding plane 12 via straight path 26 (55), thereby entirely bypassing security plane 14 of network device 10. Forwarding component 30 within forwarding plane 12 performs the determined action(s) upon the packet (56). Exemplary actions that forwarding component 30 may apply include rate limiting, queuing, routing, firewalling (i.e., blocking or dropping the packet), counting, network address translation (NAT), sequence number adjustment, quality of service (QoS), or other types of actions. In some cases, forwarding component 30 forwards the packet to the appropriate next hop according to FIB 34 or sends a response packet as needed (58). The straight path 26 may reassemble packets at the layer three (IP) layer. The application-aware path 40 may partly reassemble the packets at layer four (TCP/UDP) up to a threshold. The slow path 38 may reassemble and forward blocks of data.

Figure 3:
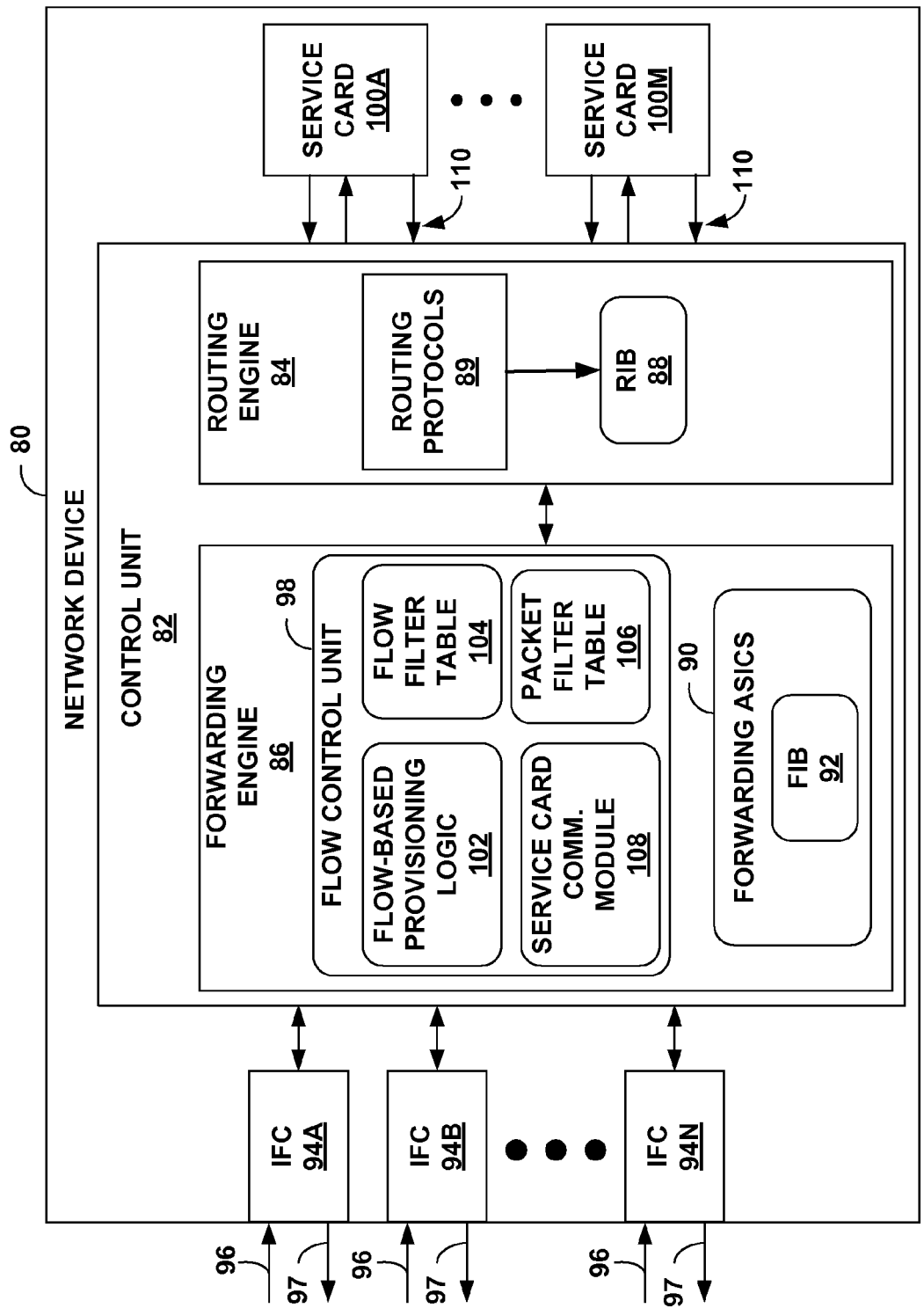
FIG. 3 is a block diagram illustrating an example network device that provides a shared forwarding plane for streamlined packet forwarding.

FIG. 3 is a block diagram illustrating another exemplary network device 80 that provides a shared forwarding plane for streamlined packet forwarding. Network device 80 may be a network device such as network device 10 of FIG. 1. FIG. 3 shows network device 80 in a logical manner to illustrate the logical interaction between modules regardless of the underlying physical implementation. Network device 80 comprises a control unit 82 that includes a routing engine 84 and a forwarding engine 86. Routing engine 84 is primarily responsible for maintaining routing information base (RIB) 88 to reflect the current topology of a network and other network entities to which it is connected. In particular, routing engine 84 periodically updates RIB 88 to accurately reflect the topology of the network and other entities. Routing engine 84 also includes routing protocols 89 that perform routing operations.

In accordance with RIB 88, forwarding application specific integrated circuits (ASICs) 90 of forwarding engine 86 maintain forwarding information base (FIB) 92 that associates network destinations with specific next hops and corresponding interface ports. For example, control unit 82 analyzes RIB 88 and generates FIB 92 in accordance with RIB 88. Network device 80 includes interface cards 94A-94N ("IFCs 94") that receive and send packets via network links 96 and 97, respectively. IFCs 94 may be coupled to network links 96, 97 via a number of interface ports.

Generally, flow control unit 98 of forwarding engine 86 may relay certain packets received from IFCs 94 to service cards 100A-100M ("service cards 100") in accordance with flow filter table 104 and packet filter table 106. Service cards 100 receive packets from flow control unit 98, selectively provide services in accordance with information within the packet, and relay the packet or any response packets to control unit 82 for forwarding by forwarding ASICs 90. Forwarding ASICs 90 may correspond to forwarding component 30 of FIG. 1, and may comprise one or more dedicated packet forwarding integrated circuits. A number of input and output logical interfaces may couple service cards 100 to control unit 82.

Forwarding engine 86 includes flow control unit 98, which includes flow-based provisioning logic 102 that distinguishes between packet flow sessions based on a five-tuple found within a header of each received packet. Flow control unit 98 references flow filter table 104 and packet filter table 106 as described above to determine whether a received packet corresponds to a trusted packet flow that may be processed via straight path 26 (i.e., bypassing service cards 100 entirely), or whether the received packet corresponds to an unknown packet flow session and should therefore be sent to one of service cards 100 for further inspection and processing, or whether the packet corresponds to a known packet flow session that nonetheless must be sent to a service card 100 for further processing. Packet filter table 106 may include static filters, which may be configured by a software process or by an administrator using a user interface of network device 80. Flow filter table 104 may include dynamic filters, such as filters that are added to filter table by commands 110 from service cards 100A-100M. The filters of flow filter table 104 and packet filter table 106 may be layer three (L3) or layer four (L4) stateless filters. Although described for purposes of example as a separate flow filter table 104 and packet filter table 106, in some aspects these tables may exist as a single merged table. The filters of flow filter table 104 and packet filter table 106 may be deleted (e.g., aged out) by control logic. In some cases, centralized/global filter tables may be used. In other cases, per chip flow tables or caches may be used along with a centralized table.

The filters of packet filter table 106 may each include an associated policy rule. Various types of policy rules may be used. For example, a marking packet filter rule may include a specific five-tuple classifier and an associated action on the packet to modify a Type of Service (ToS) or Differentiated Services Code Point (DSCP) field. As another example, a NAT packet filter rule may include a specific five-tuple classifier and an associated action to modify the IP address and port number fields of a packet and adjust a checksum. As a further example, a firewall packet filter rule may include a specific five-tuple classifier and an associated action of dropping the packet. Flow control unit 98 may remove these filter rules after a certain time, e.g., based on a level of inactivity of the rules.

Flow control unit 98 may select a particular one of service cards 100 to which to send the packet depending on what kind of service a matching filter indicates is to be performed on the packet. In some cases, flow control unit 98 may send packets to a master service card 100 or a default service card 100 or set of default service cards 100. In one embodiment, flow control unit 98 will perform a simple symmetric weighted hash on the source IP address and destination IP address of the packet to load balance the packet across service cards 100. In addition, service cards 100 may provide feedback to flow control unit 98 via service card communication module 106 (SERVICE CARD COMM. MODULE 106) to indicate when capacity of one or more of service cards 100 is close to being saturated.

Service cards 100 may update flow filter table 104 via commands 110 to service card communication module 108 to add new filters to flow filter table 104. For example, as described above, when flow control unit 98 directs the first packet of a new packet flow session to one of service cards 100 (e.g., service card 100A), service card 100A will process the packet and may determine that the packet flow is a trusted packet flow that can be subsequently processed on the straight path 26 within forwarding engine 86 and need not be sent to the service plane (i.e., service cards 100). In this case, service card 100A sends a command 110 to service card communication module 108 to add a filter to flow filter table 104, where the filter identifies the trusted packet flow (e.g., with an exact match five-tuple filter) and specifies that the packet flow may bypass service cards 100 and be processed on straight path 26. Forwarding engine communication module 124 and service card communication module 108 may use an internal messaging scheme in which commands are exchanged to add and delete the dynamic filters and corresponding actions. In this manner, network device 80 may avoid unnecessarily sending packets of a trusted packet flow session through the security plane. This may improve latency of network device 80.

In one embodiment, each of forwarding engine 86 and routing engine 84 may comprise one or more dedicated processors, hardware, and the like, and may be communicatively coupled by a data communication channel. The data communication channel may be a high-speed network connection, bus, shared-memory or other data communication mechanism. Forwarding engine 86, routing engine 84, or both, may make use of the data structures and organization described above with respect to FIG. 1. For example, routing plane 16 of FIG. 1 may correspond to routing engine 84, forwarding plane 12 of FIG. 1 may correspond to forwarding engine 86 and interface cards 94, and security plane 14 of FIG. 1 may correspond to service cards 100.

Network device 80 may further include a chassis (not shown) for housing control unit 82. The chassis has a number of slots (not shown) for receiving a set of cards, including IFCs 94 and service cards 100. Each card may be inserted into a corresponding slot of the chassis for electrically coupling the card to control unit 82 via a bus, backplane, or other electrical communication mechanism.

Service cards 100 relay processed packets or reply packets to control unit 82. Control unit 82 identifies the appropriate forwarding ASIC 90 associated with the packet. In some embodiments, different forwarding ASICs 90 may have different associated FIBs 92. Control unit 82 may associate the packet with a corresponding one of forwarding ASICs 90 as specified by matching filters. Control unit 82 forwards the packet in accordance with FIB 92.

Forwarding ASICs 90 may apply one or more actions to packets relayed to forwarding ASICs 90 by control unit 82, as specified by matching filters. For example, forwarding ASICs 90 may perform rate limiting, queuing, packet mirroring, routing, firewalling (i.e., blocking or dropping the packet), counting, logging, network address translation (NAT), sequence number adjustment, quality of service (QoS), or other types of actions.

Network device 80 may operate according to executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of network device 80 may be implemented by executing the instructions of the computer-readable storage medium with one or more processors, discrete hardware circuitry, firmware, software executing on a programmable processor, or a combination of any of the above.

Figure 4:
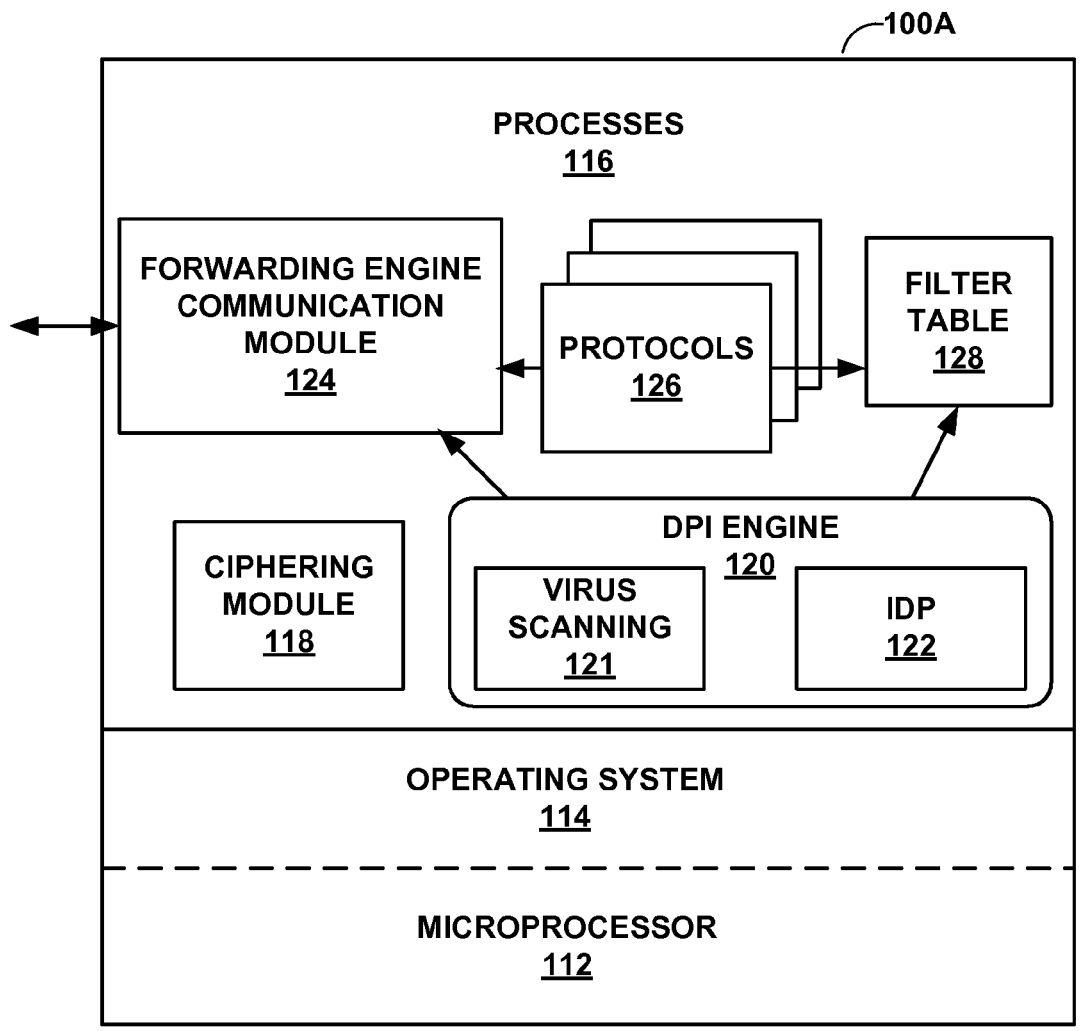
FIG. 4 is a block diagram illustrating an example embodiment of service card 100A of network device of FIG. 3 in further detail.

FIG. 4 is a block diagram illustrating an example embodiment of service card 100A of network device of FIG. 3 in further detail. Service card 100A may include one or more microprocessors 112 that executes an operating system 114 and software processes 116. Operating system 114 may represent a module that provides a standard operating system, such as a real-time operating system or a Unix-based operating system, an operating system dedicated to processing of packet or other data units, or any other conventional operating system. In some embodiments, operating system 114 may be isolated from an overall operating system of network device 80.

Processes 116 may be software applications that execute on top of operating system 114. As shown in FIG. 4, processes 116 may include a ciphering module 118, a deep packet inspection (DPI) engine 120 having a virus scanning module 121 and an intrusion detection and prevention (IDP) module 122, a forwarding engine communication module 124 by which service card 100A communicates with service card communication module 108 of forwarding engine 86 (FIG. 3), and a plurality of protocols 126. Service card 100A may also include a filter table 128 that provides a repository for dynamic filters. The dynamic filters may be installed by protocols 126. In some embodiments, processes 116 may include other modules, but for ease of illustration only includes the modules shown. Although service card 100A is illustrated as including all of processes 116 in a single service card, in some cases various types of processes 116 may be found in separate, dedicated service cards.

Processes 116 may execute "on top of" operating system 114 in the sense that operating system 114 provides an execution environment in which processes 116 may execute. In other embodiments, processes 116 may execute as standalone modules that do not require operating system 114 to provide an execution environment. Although processes 116 are described herein as software, the techniques of the invention contemplate that these software modules may be implemented as either a standalone hardware module or a combination of both hardware and software. Thus, the principles of the invention should not be strictly limited to the illustrated embodiment.

Microprocessor 112 may produce an interrupt to invoke DPI engine 120 for inspection of packets, sometimes referred to as "deep packet inspection." For example, the packets may be "first path" packets received from control unit 82 of network device 80. Deep packet inspection is intended to suggest that information within the packet is subjected to inspection by, for example, firewall modules, anti-virus software (i.e., virus scanning module 121), intrusion detection and prevention (IDP) module 122, and other inspection modules such as protocol inspection modules that ensure the packets adhere to protocol rules or specifications.

Deep packet inspection may involve partial message reassembly, and may do classification based on signatures (generic pattern matching, meta-data-driven) or protocol decoders. This classification may be hardware-assisted to support a large number of filters. In addition, protocol decoding may be a meta-data-driven process as well. For example, a generic engine may be used for main patterns such as type-length-value (TLV)-based, Abstract Syntax Notation One (ASN.1)-based, or text-based protocols, and additional meta-data to drive protocols based on information models, e.g., Simple Network Management Protocol (SNMP), Lightweight Directory Access Protocol (LDAP), and the like. A forwarding model may be flexible depending on the action to be applied. Two example forwarding models include: (1) copy packet, forward, and reassemble; or (2) reassemble and hold.

In some cases, DPI engine 120 may invoke forwarding engine communication module 124 to provide a command to service card communication module 108 of forwarding engine 86 to install a new dynamic filter based on the deep packet inspection. In other cases, one of protocols 126 may invoke forwarding engine communication module 124 to provide a command to service card communication module 108 of forwarding engine 86 to install a new dynamic filter based on the deep packet inspection. The newly installed dynamic filters may re-route subsequent packets for a given packet flow onto straight path 26 to allow the packet flow to bypass service cards 100. Forwarding engine communication module 124 and service card communication module 108 may use an internal messaging scheme in which commands are exchanged to add and delete the dynamic filters and corresponding actions.

If these first path packets pass the deep packet inspection by DPI engine 120, DPI engine 120 may reference filter table 128 to determine whether the packets should undergo further processing by protocols 126. DPI engine 120 may analyze the packets based on information included within a header of each packet or any other information included within each packet. Filter table 128 may comprise layer four (L4) or layer seven (L7) stateful filters, i.e., filters that apply at the transport layer or the application layer of the OSI reference model, respectively. The further processing by protocols 126 may include full message processing that involves full message reassembly, and application-specific processing. Protocols 126 may include application layer gateway (ALG) and protocol proxy applications. For example, one of protocols 126 may be a Session Initiation Protocol (SIP) proxy module that sets up Voice over Internet Protocol (VoIP) calls. In addition, protocols 126 may include protocols for eXtensible Markup Language (XML) parsing of packets. XML parsing may be driven by schema meta-data. If however these first path packets do not pass the deep packet inspection, DPI engine 120 may drop, detain, log, delete, remove or otherwise prohibit the packets from reaching a guarded private network.

Alternatively or additionally, service card 100A may provide other types of services, such as ciphering performed by ciphering module 118. For example, ciphering module 118 may perform packet ciphering (e.g., using the Internet Protocol Security (IPSec) protocol) and/or message ciphering (e.g., using the Transport Layer Security (TLS) protocol). Another example service that service card 100A may provide is authentication services. In this case, service card 100A may include an authentication module (not shown). For example, service card 100A may provide authentication services for a mobile telephone user requesting access to a VPN. The service card 100A may need to authenticate a VPN session interacting with a RADIUS/AAA server within the requested VPN to which the mobile user requests access in order to determine whether to grant the mobile user access to the VPN.

Figure 5:
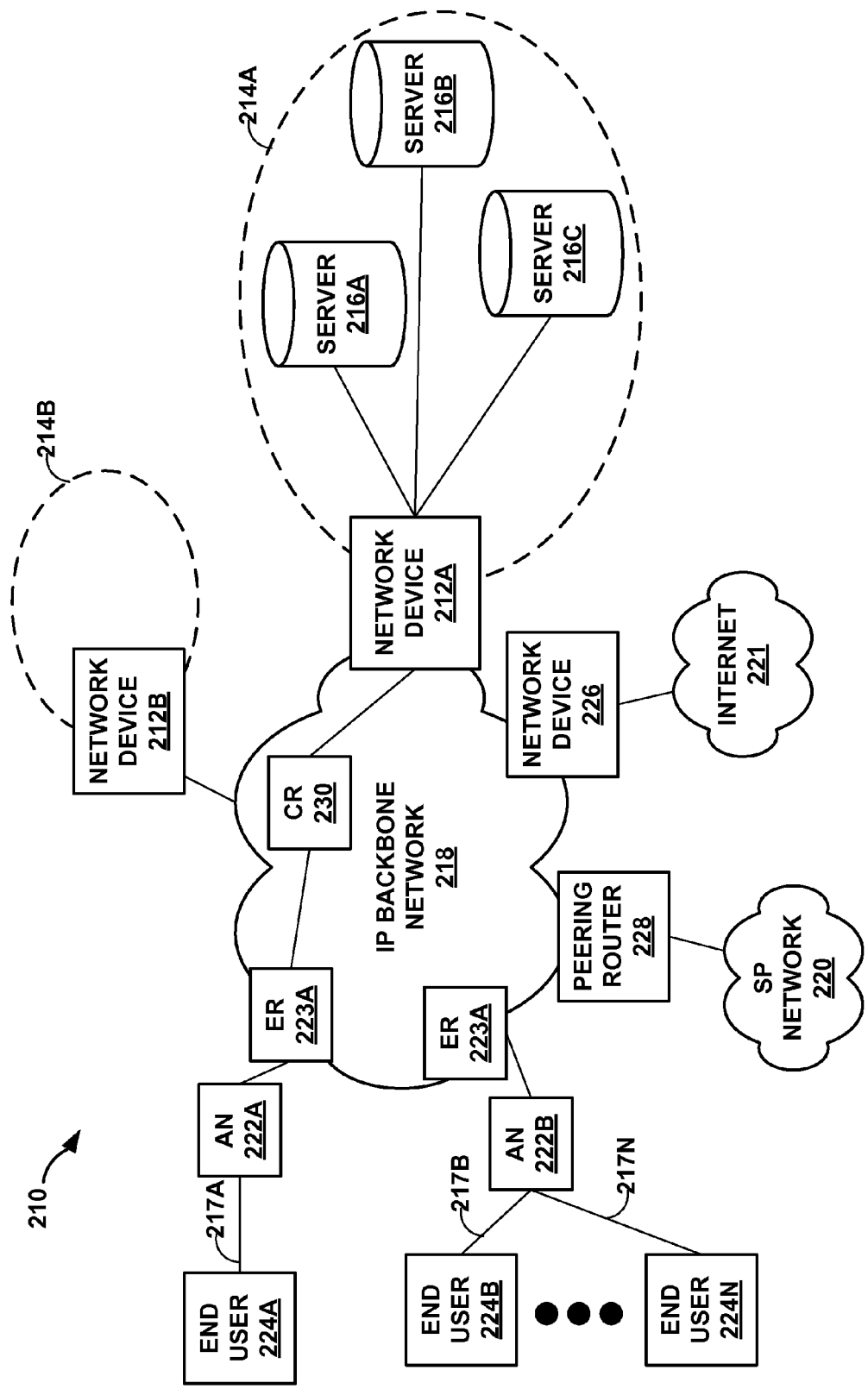
FIG. 5 is a block diagram illustrating an example system in which network devices provides routing and security services for a service provider network in accordance with various embodiments of the invention.

FIG. 5 is a block diagram illustrating an example system 210 in which network devices provides routing and security services for a service provider network in accordance with various embodiments of the invention. Network device 212A may be a network device that integrates routing and firewall functions by employing a shared forwarding plane, such as network device 80 of FIG. 3 or network device 10 of FIG. 1. Network devices 212A and 212B ("network devices 212") couple data centers 214A, 214B, respectively, to an Internet Protocol (IP) backbone network 218 of the service provider. IP backbone network 218 includes one or more autonomous systems (not shown) having a number of devices, such as routers and switches, used to forward packets across IP backbone network 218. IP backbone network 210 and data centers 214A and 214B ("data centers 214") may all be part of a single service provider network. IP backbone network 218 of the service provider network is also coupled to another service provider network 220 (i.e., a different carrier) by a peering router 228, and is coupled to the Internet 221 by network device 226. Peering router 228 and network device 226 may provide perimeter security to IP backbone network 218 of the service provider.

Data centers 214 may be geographically distributed data centers of a single service provider. In the example of FIG. 5, data center 214A includes servers 216A-216C ("servers 216"). Servers 216 may include various types of servers, such as application servers (e.g., web servers, file transfer protocol (FTP) servers), signaling servers (e.g., SIP servers), video servers, or other types of servers. End users 224A-224N may be geographically distributed end user customers. For example, end users 224 may include one or more devices (not shown), such as personal computers, laptop computers, handheld computers, workstations, servers, routers, switches, printers, fax machines, or the like. Each of end users 224 connects to access nodes (ANs) 222A-222B ("ANs 222") via one or more access links 217A-217N ("access links 217"). In some cases, access links 217 may be wireless access links. Access nodes 222 may be connected to IP backbone network 218 by edge routers (ERs) 223A-223B, which may be network devices such as BRASs, BNGs, MSEs, PDSNs, GGSNs and the like. Although system 10 may include any number of end users 224 coupled to IP backbone network 218 by any number of access nodes 222, for simplicity, FIG. 5 shows only end users 224 coupled to IP backbone network 218 by access nodes 222.

Data centers 214 may employ perimeter-oriented security using network devices 212. Data centers 214 may experience a high volume of traffic flowing both in and out of data centers 214. Data centers 214 may have security zones with specific policy rules for different types of servers. Some exchanges between data centers 214A and 214B may require only a Virtual Private Network (VPN), but no additional perimeter security, because these exchanges between data centers 214A and 214B are known to be trusted communications. For example, network device 212A may know that certain VPN traffic or traffic having a subset of IP addresses (i.e., an particular IP subnet) as the source address can be trusted. This traffic need not traverse the firewall components of network device 212A, i.e., the security plane. Instead, this traffic can be processed on the straight path 26 of network device 212A. Static filters may be defined within a packet table of network device 212A that specify that, based on headers of the packets, packet flows associated with certain VPNs or certain IP subnets may be processed on the straight path. These static filters may be defined by an administrator or a control logic that is external to network device 212A.

In addition, other network traffic may not be trusted. For example, certain Transmission Control Protocol (TCP) traffic that may not be characterized by IP subnet or a VPN may be sent from end user 224A to data center 214A. In these situations, flow control unit 98 of end user 224A may initially direct the TCP traffic associated with a new TCP session to the security plane for processing, e.g., on first path 22 to one of service cards 100. For example, this may be by way of a default filter that directs all unknown TCP traffic to service cards 100. DPI engine 120 of the service card 100 may use virus scanning or IDP to filter out any bad TCP messages, which may be due to attempted attacks on data center 214A. DPI engine 120 may invoke forwarding engine communication module 124 to communicate with service card communication module 108 install a dynamic filter within flow filter table 104 of the forwarding plane to block any unauthorized TCP packet flows (e.g., for TCP packets determined to be malicious).

For TCP messages associated with the TCP session that have passed inspection by DPI engine 120, DPI engine 120 may reference filter table 128 within the service card 100 to determine whether a TCP packet is relevant for processing at the ALG/proxy level. If so, DPI engine 120 provides the packet to protocols 126 for further processing, i.e., sends the packet onto the slow path 38. If not, DPI engine 120 sends the packet onto the application-aware path 40. For example, one protocol 126 may be a TCP ALG that looks up policy rules per security zone, and creates and deletes dynamic filters for TCP sessions. Other protocols 126 may include application-specific ALGs that create additional packet filters as appropriate, e.g., FTP or SIP. The TCP ALG creates a dynamic filter for the TCP session that takes a higher priority over the default filter. The dynamic filter may direct packets associated with the authorized TCP session to bypass the security plane and go directly to processing at the forwarding plane by way of the straight path. In this manner, network device 212A displays a mixture of both firewall behavior and routing behavior in a dynamic manner.

In some cases, a malicious attacker may attempt a TCP SYN attack. In general, firewalls may try to protect themselves from TCP SYN attacks by processing SYN packets and acting as a TCP proxy. Firewalls may adjust sequence numbers within the TCP headers of TCP packets in order to defeat TCP SYN attacks. If a TCP session is found to be legitimate, the TCP session is allowed to continue; if a TCP session is found to be malicious, the TCP session is ended. Once a TCP session is fully established, it is desirable for the TCP session to be able to be sent on the straight path, as described above, rather than passing the TCP packets through the service plane. Thus, the functionality to adjust TCP packet sequence numbers may be located within the forwarding plane of network device 212A, e.g., within forwarding ASICs 90. Network device 212A is then able to use the straight path for established TCP sessions, and adjusts the TCP packet sequence numbers on the fly within the forwarding plane. In this manner, network device 212A may be able to process TCP packets in a more efficient manner by leveraging packet forwarding. Network device 212A may also perform in a similar manner with respect to sequence numbers or other protocol fields used by Real-time Transport Protocol (RTP) packets or Stream Control Transmission Protocol (SCTP) packets.

Figure 6:
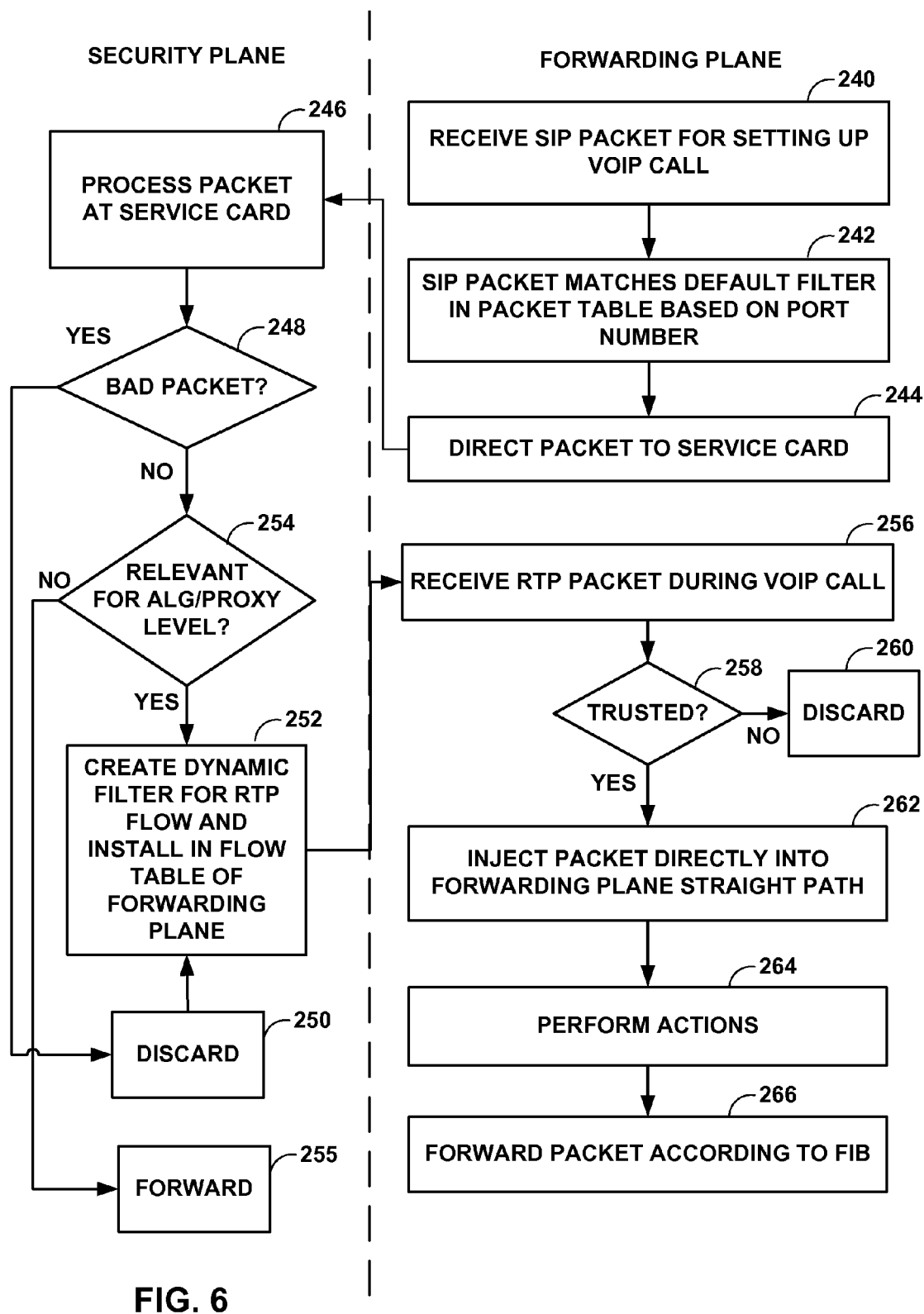
FIG. 6 is a flowchart illustrating an example mode of operation of a peering router of FIG. 5.

An additional embodiment of the techniques described herein will now be described with reference to FIG. 6. FIG. 6 is a flowchart illustrating one example mode of operation of peering router 228 of FIG. 5. Peering router 228 provides access by another service provider network 220 to the service provider network that includes IP backbone network 218. Peering router 228 may provide routing and security functions to protect the service provider network. Peering router 228 may be a network device that integrates routing and firewall functions by employing a shared forwarding plane, such as network device 80 of FIG. 3 or network device 10 of FIG. 1.

For example, in the case of setting up a Voice over IP (VoIP) call, peering router 228 receives SIP signaling packets during call setup (240). The SIP signaling packets match a default filter in packet table 104 that directs all SIP packets to the service plane. For example, the matching may be based on the well-known port number 5060 associated with SIP. The default filter directs the packet to a service card 100 of peering router 228, e.g., service card 100A (244). The packet under-goes processing at the service card 100A, such as by DPI engine 120 (246) to determine whether the packet is a bad SIP packet (248). If the packet is bad (e.g., associated with a potential network attack) (YES branch of 248), DPI engine 120 may discard the packet (250). DPI engine 120 may also create a dynamic filter for a Real-time Transport Protocol (RTP) packet flow associated with the bad SIP packet to block any associated RTP packets, and invoke forwarding engine communication module 124 to send a command to service card communication module 108 of forwarding engine 86 to install the dynamic filter in flow filter table 104 (252). Because RTP packets use dynamic port numbers, dynamic customized filters are needed.

If the packet is not a bad packet (NO branch of 248), DPI engine 120 may determine whether the packet matches filters for those SIP messages relevant for processing at the ALG/proxy level (254). If not, DPI engine 120 forwards the packet (255). If so, DPI engine passes the packet to the ALG/proxy level (i.e., protocols 126) for processing. For example, protocols 126 may include a SIP proxy. SIP proxy may create a dynamic filter as appropriate, such as for a corresponding RTP flow, and invoke forwarding engine communication module 124 to send a command to service card communication module 108 of forwarding engine 86 to install the dynamic filter in flow filter table 104 (252).

When peering router 228 subsequently receives an RTP packet, e.g., during a VoIP call (256), flow control unit 98 references flow filter table 104 and may find a matching filter, such as one of the dynamic filters recently installed. If the filter indicates that the RTP packet flow cannot be trusted (NO branch of 258), flow control unit 98 discards the packet (260). If the filter indicates that the RTP packet flow can be trusted (YES branch of 258), flow control unit 98 bypasses the security plane altogether and injects the packet directly into the straight path 26 of the forwarding plane of peering router 228 (262). Forwarding engine 86 performs appropriate actions on the packet according to the filter rule (264). For example, the filter rule may specify to perform queuing, rate-limiting, and/or NAT on the packet. Forwarding ASICs 90 then forward the packet according to FIB 92 (266). When flow control unit 98 receives non-voice traffic, packet filters may specify to forward the non-voice traffic on the straight path 26 for processing. Other ALG/proxy modules in this context may include media processing functions such as monitoring/mobility service (MoS) modules, or transcoding modules, which redirect selective RTP flows.

Another example embodiment of the techniques described herein will now be described with respect to peering router 228. In some cases, some service providers may use private IP Version Four (IPv4) addresses or IP Version Six (IPv6) in their IP backbone network, while other service providers may use public IPv4 addresses. For example, IP backbone network 218 may use private IPv4 addresses or IPv6 addresses while the service provider network 220 uses public IPv4 addresses. In both the private-to-public IPv4 scenario and the IPv6- to IPv4 scenario, peering router 228 must perform Network Address Translation (NAT) on each and every packet being sent between IP backbone network 218 and service provider network. This quickly becomes impractical in conventional firewall devices as the amount of peering traffic to be processed increases, because all of the network traffic going through the conventional firewall device must be sent through a service card where NAT is performed.

In some cases, certain TCP/UDP traffic associated with new sessions may be designated for the straight path 26 by way of static filters in packet filter table 106, e.g., based on IP subnets. In accordance with the techniques described herein, peering router 228 may by default initially filter most or all other new TCP/UDP session packet flows to the security plane, that is, one of service cards 100, for processing by DPI engine 120. This default filtering of new TCP/UDP packet flows may be referred to as an "exception path." DPI engine 120 of the service card 100 filters out any bad TCP/UDP packets. DPI engine 120 may invoke forwarding engine communication module 124 to communicate with service card communication module 108 install a dynamic filter within flow filter table 104 of the forwarding plane to block any unauthorized TCP/UDP packet flows (e.g., for TCP/UDP packets determined to be malicious).

DPI engine 120 may reference filter table 128 within the service card 100 to determine whether a TCP or UDP packet is relevant for processing at the ALG/proxy level. If so, DPI engine 120 provides the packet to protocols 126 for further processing, i.e., sends the packet onto the slow path 38. If not, DPI engine 120 sends the packet onto the application-aware path 40. For example, one protocol 126 may be a generic TCP/UDP ALG. The generic TCP/UDP ALG may look up policy rules per security zone, allocate a NAT IP address, and create a dynamic NAT filter having a NAT translation rule with the allocated NAT IP address. The generic TCP/UDP ALG invokes forwarding engine communication module 124 to communicate with service card communication module 108 install the dynamic NAT filter within flow filter table 104 of the forwarding plane for the new authorized packet flow with a corresponding NAT translation rule. The newly installed filter may include source and destination IP addresses and a port number associated with the authorized packet flow. Similar processing may be performed by an application-specific ALG or a local proxy module. The local proxy module may also install a Real-time Transport (RTP) filter. This processing is stateful since the TCP and UDP packet flows need to be allocated a free NAT IP address.

When peering router 228 receives subsequent packets of an authorized TCP/UDP packet flow, flow control unit 98 of peering router 228 references flow filter table 104 and determines that the packets match the newly installed filter. Flow control unit 98 sends the packets on the straight path in accordance with the matching filter, thereby bypassing the security plane (i.e., service cards 100). In the straight path, forwarding ASICs 90 apply the NAT translation rule specified by the matching filter to the packets in the forwarding plane on the fly. In this manner, peering router 228 can process a large volume of traffic without high latency since only the first packets of TCP/UDP session packet flows need to be processed through the service cards 100.

In another example embodiment, server 216A may be a video server providing video-on-demand services to end user 224A. This situation is Quality of Service (QoS)-sensitive, since it is highly desirable not to drop video packets. Most of the traffic in this application is directed from server 216A to end user 224A. However, some small percentage of the traffic will include control packets (e.g., Real-Time Streaming Protocol (RTSP) packets) from end user 224A to server 216A, such as to request new video or change broadcast channels. The control packets coming in to data center 214A may present a security risk, but because the volume of control packets is so small compared to the volume of data packets going out of data center 214A, it may not make sense to put strict firewall protections on network device 212A for all packets.

Thus, in a manner similar to that described above with respect to the previous examples, network device 212A may include a default filter within packet filter table 106 that sends traffic destined to video server 216A to the service plane.

RTSP packets may undergo processing by DPI engine 120. Authorized RTSP packets may be matched as relevant to send to the ALG/Proxy level (protocols 126). The proxy level may install dynamic filters within flow filter table 104, e.g., that require QoS actions in the forwarding plane for corresponding RTP packet flows, such as queuing or rate-limiting. Real-time Transport Protocol (RTP) packets that transport the video data to the end-users may be filtered in the forwarding plane and directed on the straight path 26 to undergo the appropriate QoS actions as specified by the filters. Non-video packets may also be filtered and forwarded on the straight path to the user. Optionally, Distributed Denial of Service (DDoS) packet filters may be added to block attackers at the packet level. By unifying the forwarding plane of the security plane and the routing plane and using dynamic filters, the techniques of the invention allow for streamlining the packet forwarding process by minimizing unnecessary processing and U-turns in packet forwarding.

The techniques of the invention are not limited to edge devices, but may also be applied to core network devices, such as network devices within IP backbone network 218, as the following example illustrates. Core router 230 ("CR 230") is a network device within the IP backbone network 218. In one example embodiment, IP backbone network 218 belongs to a mobile carrier that provides mobile services to end users 224. In this case, core router 230 may be a device located between Gateway GPRS (General Packet Radio Services) Support Nodes (GGSNs), Serving GPRS Support Nodes (SGSNs), or Packet Data Serving Nodes (PDSNs) of IP backbone network 218. Core router 230 may be a network device that integrates routing and security functions by employing a shared forwarding plane, such as network device 80 of FIG. 3 or network device 10 of FIG. 1.

GGSNs use the GPRS Tunneling Protocol (GTP) for mobile communications. Devices using GTP may be susceptible to security attacks based on control messages. Core router 230 may be placed between GGSNs to provide protection from security attacks. On the one hand, GTP-C packets (control packets) may often be the source of security attacks, and should therefore be subject to scrutiny. On the other hand, GTP-U packets (user data packets) are not frequently the source of security attacks, and so do not need extra scrutiny. Core router 230 may include a default filter in packet filter table 106 of flow control unit 98 that directs all GTP-C traffic to the service plane of core router 230, that is, to one of service cards 100, for processing by DPI engine 120.

DPI engine 120 of the service card 100 filters out any bad GTP-C packets. DPI engine 120 may invoke forwarding engine communication module 124 to communicate with service card communication module 108 install a dynamic filter within flow filter table 104 of the forwarding plane to block any unauthorized GTP-C packet flows (e.g., for GTP-C packets determined to be malicious).

DPI engine 120 may reference filter table 128 within the service card 100 to determine whether a GTP-C packet is relevant for processing at the ALG/proxy level. If so, DPI engine 120 provides the packet to protocols 126 for further processing, i.e., sends the packet onto the slow path 38. If not, DPI engine 120 sends the packet onto the application-aware path 40. For example, one protocol 126 may be a GTP control logic that tracks GTP sessions and creates and deletes dynamic filters for GTP-U packets. The GTP control logic creates a dynamic filter that allows GTP-U packets for an authorized GTP session to be processed on the straight path 26. The GTP control logic invokes forwarding engine communication module 124 to communicate with service card communication module 108 install the dynamic filter within flow filter table 104 of the forwarding plane for the new authorized GTP packet flow. The newly installed filter may include a five-tuple plus a tunnel identifier to match to the authorized GTP packet flow. The filter may direct the GTP-U packet flow to the straight path, or may direct the GTP-U packets on the first path 22 to the service plane for minimal IDP processing. Similar principles may apply in the case that core router 230 is instead an aggregation router within IP backbone network 218. Additionally, other tunneling protocols such as IP over IP or Generic Route Encapsulation (GRE) may also use filters comprising a five-tuple plus a tunnel identifier to match to authorized packet flows.

In another example, a network device such as a next-generation GGSN or PDSN may by default filter all traffic to the service plane for pay-per-item IP subscribers, while flat-rate IP subscribers are filtered to the straight path 26. In the service plane, the pay-per-item IP traffic may be filtered for processing by accounting control logic that determines charges to the subscriber and makes policy decisions regarding when subscriber quota has been exhausted. The traffic may also be processed by a Hyper-Text Transfer Protocol (HTTP) proxy that redirects the packets to an ad insertion module.

Various embodiments of the invention have been described. These and other embodiments are within the scope of the following claims.

The invention claimed is:

1. A network router comprising:
 a plurality of interfaces configured to send and receive packets;
  a routing engine comprising a control unit that executes a routing protocol to maintain routing information specifying routes through a network;
  a forwarding plane configured by the routing engine to select next hops for the packets in accordance with the routing information, the forwarding plane comprising a switch fabric to forward the packets to the interfaces based on the selected next hops; and
  a security plane configured to apply security services to the packets,
 wherein the forwarding plane includes a flow control module that, upon receiving packets from the network, directs one or more of the packets to the security plane for application of the security services, and
  wherein the security plane processes the packets received from the forwarding plane and, based on the processing of the packets received from the forwarding plane, outputs commands to the forwarding plane directing the forwarding plane to dynamically install at least one filter within the forwarding plane to dynamically configure the flow control module for processing packets subsequently received from the network.

2. The network router of claim 1,
 wherein the commands specify the at least one filter to include criteria for a trusted packet flow, wherein, subsequent to installation of the at least one filter, the forwarding plane applies the at least one filter to received packets to identify any packets associated with the trusted packet flow, and
 wherein, upon identifying packets associated with the trusted packet flow, the forwarding plane bypasses the security plane and forwards the packets in accordance with the routing information without directing the identified packets to the security plane.

3. The network router of claim 1, wherein the forwarding plane stores and applies a common set of filters that are managed by the security plane and the routing engine.

4. The network router of claim 3,
wherein the common set of filters specify routing policies specified by the routing engine and security policies specified by the security plane, and
wherein the forwarding plane comprises a set of forwarding integrated circuits that applies actions to received packets in accordance with the routing policies and the security policies.

5. The network router of claim 4, wherein the routing policies comprise one or more of queuing, rate-limiting, packet mirroring, marking, Quality of Service (QoS), and routing.

6. The network router of claim 4, wherein the security policies comprise one or more of blocking packets, counting packets, logging packets, performing network address translation (NAT), and performing sequence number adjustment.

7. The network router of claim 1, wherein the network router comprises one of an edge router, peering router, or core router of a Service Provider (SP) network.

8. The network router of claim 1, wherein the network router comprises one of an edge router that provides broadband access, an edge router that provides mobile access, a data center edge router, a peering router, an aggregation router, or a core router.

9. The network router of claim 1, wherein the network router comprises one of a Broadband Remote Access Server (BRAS), a Broadband Network Gateway (BNG), a Cable Modem Termination System (CMTS), a Multi-Service Edge router (MSE), a Gateway GPRS (General Packet Radio Services) Support Node (GGSN), a Packet Data Serving Node (PDSN), and a Public Data Network Gateway (PDN-GW).

10. The network router of claim 1, wherein the security plane comprises:
a deep packet inspection engine that performs intrusion detection and prevention (IDP) processing and virus scanning to received packets, and that dynamically creates dynamic filters within the forwarding plane based on the intrusion detection and prevention processing and virus scanning, and
a forwarding engine communication module that formulates the commands to specify the dynamic filters and outputs the commands to instruct the forwarding plane to install the dynamic filters in the forwarding plane.

11. The network router of claim 1, wherein the security plane comprises:
at least one of an application layer gateway (ALG) software module or a proxy software module executing within the security plane to dynamically create dynamic filters within the forwarding plane based on the packets received from the forwarding plane, and
a forwarding engine communication module that formulates the commands to specify the dynamic filters and outputs the commands to instruct the forwarding plane to install the dynamic filters in the forwarding plane.

12. The network router of claim 1, wherein the forwarding plane comprises forwarding integrated circuits that provide one or more stages of a multi-stage switch fabric.

13. A network router comprising:
a plurality of interfaces configured to send and receive packets;
a routing engine comprising a control unit that executes a routing protocol to maintain routing information specifying routes through a network;
a forwarding plane configured by the routing engine to select next hops for the packets in accordance with the routing information, the forwarding plane comprising a switch fabric to forward the packets to the interfaces based on the selected next hops; and
a security plane configured to apply security services to the packets,
wherein the forwarding plane includes a flow control module that, upon receiving packets from the network, directs one or more of the packets to the security plane for application of the security services, and
wherein the security plane processes the packets and outputs commands to the forwarding plane to dynamically configure the flow control module,
wherein the forwarding plane stores and applies a common set of filters that are managed by the security plane and the routing plane, and
wherein the common set of filters comprises:
(i) filters that configure the forwarding plane to direct matching packets to the security plane for deep packet inspection,
(ii) filters that configure the forwarding plane to bypass the security plane for matching received packets for immediate forwarding in accordance with the routing information,
(iii) filters that configure the forwarding plane to apply routing policies to received packets in the forwarding plane, and
(iv) filters that configure the forwarding plane to apply security policies to received packets in the forwarding plane.

14. A network router comprising:
a plurality of interfaces configured to send and receive packets;
a routing engine comprising a control unit that executes a routing protocol to maintain routing information specifying routes through a network;
a forwarding plane configured by the routing engine to select next hops for the packets in accordance with the routing information, the forwarding plane comprising a switch fabric to forward the packets to the interfaces based on the selected next hops; and
a security plane configured to apply security services to the packets,
wherein the forwarding plane includes a flow control module that, upon receiving packets from the network, directs one or more of the packets to the security plane for application of the security services, and
wherein the security plane processes the packets and outputs commands to the forwarding plane to dynamically configure the flow control module,
wherein the forwarding plane comprises a flow filter table and a packet filter table to store the filters,
wherein the flow table stores within the forwarding plane dynamic filters installed within the forwarding plane in response to commands from the security plane, and
wherein the packet filter table stores static filters that include at least one of filters based on Internet Protocol (IP) subnets and virtual private network (VPN) configuration data.

15. A method comprising:
receiving packets at a plurality of interfaces of a network router, wherein the plurality of interfaces are configured to send and receive packets;
maintaining routing information specifying routes through a network by executing a routing protocol on a control unit of a routing engine of the router;
selecting next hops for the packets within the network with a forwarding plane configured by the routing engine;

forwarding the packets to the interfaces in accordance with the routing information;
applying security services to the packets with a security plane of the network router;
directing, by a flow control module of the forwarding plane, one or more of the received packets to the security plane for application of the security services;
by the security plane, processing the packets received from the forwarding plane; and
based on the processing of the packets received from the forwarding plane, outputting commands by the security plane to the forwarding plane directing the forwarding plane to dynamically install at least one filter within the forwarding plane to dynamically configure the flow control module for processing packets subsequently received from the network.

16. The method of claim 15,
wherein outputting commands comprises outputting commands that specify the at least one filter to include criteria for a trusted packet flow,
further comprising:
subsequent to installation of the at least one filter, applying the at least one filter to received packets to identify any packets associated with the trusted packet flow, and
upon identifying packets associated with the trusted packet flow, bypassing the security plane and forwarding the packets in accordance with the routing information without directing the identified packets to the security plane.

17. The method of claim 15, further comprising:
performing intrusion detection and prevention (IDP) processing and virus scanning to received packets;
dynamically creating dynamic filters for use within the forwarding plane based on the intrusion detection and prevention processing and virus scanning;
formulating the commands to specify the dynamic filters; and
by the security plane, outputting the commands to instruct the forwarding plane to install the dynamic filters in the forwarding plane.

18. The method of claim 15, further comprising:
dynamically creating dynamic filters within the forwarding plane based on the packets received from the forwarding plane with at least one of an application layer gateway (ALG) software module or a proxy software module executing within the security plane; and
formulating the commands with a forwarding engine communication module to specify the dynamic filters; and
by the security plane, outputting the commands to instruct the forwarding plane to install the dynamic filters in the forwarding plane.

19. A method comprising:
receiving packets at a plurality of interfaces of a network router, wherein the plurality of interfaces are configured to send and receive packets;
maintaining routing information specifying routes through a network by executing a routing protocol on a control unit of a routing engine of the router;
selecting next hops for the packets within the network with a forwarding plane configured by the routing engine;
forwarding the packets to the interfaces in accordance with the routing information;
applying security services to the packets with a security plane of the network router;
directing, with a flow control module of the forwarding plane, one or more of the received packets to the security plane for application of the security services;
processing the packets with the security plane;
outputting commands with the security plane to the forwarding plane to dynamically configure the flow control module;
processing a first set of the packets at the security plane;
outputting commands by the security plane directing the forwarding plane to dynamically install a least one filter within the forwarding plane based on the processing;
storing a common set of filters within the forwarding plane that are managed by the security plane and the routing plane, wherein the common set of filters specify routing policies specified by the routing engine and security policies specified by the security plane, and wherein the forwarding plane comprises a set of forwarding integrated circuits that applies actions to received packets in accordance with the routing policies and the security policies,
wherein the common set of filters comprises:
(i) filters that configure the forwarding plane to direct matching packets to the security plane for deep packet inspection,
(ii) filters that configure the forwarding plane to bypass the security plane for matching received packets for immediate forwarding in accordance with the routing information,
(iii) filters that configure the forwarding plane to apply routing policies to received packets in the forwarding plane, and
(iv) filters that configure the forwarding plane to apply security policies to received packets in the forwarding plane.

20. A network router comprising:
a plurality of interfaces configured to send and receive packets;
a routing component comprising:
(i) a routing engine comprising a control unit that executes a routing protocol to maintain routing information specifying routes through a network, and
(ii) a forwarding plane configured by the routing engine to select next hops for the packets in accordance with the routing information, the forwarding plane comprising a switch fabric to forward the packets to the interfaces based on the selected next hops; and
a security plane configured to apply security services to the packets, wherein the security plane is integrated within the network router to share the forwarding plane of the routing component, wherein the security plane outputs commands to dynamically configure the forwarding plane, and wherein the forwarding plane stores and applies a common set of filters that are managed by the security plane and the routing component.

21. A network router comprising:
a plurality of interfaces configured to send and receive packets;
a routing engine comprising a control unit that executes a routing protocol to maintain routing information specifying routes through a network;
a forwarding plane configured by the routing engine to select next hops for the packets in accordance with the routing information, the forwarding plane comprising a switch fabric to forward the packets to the interfaces based on the selected next hops; and a security plane configured to apply security services to the packets, wherein the forwarding plane includes a flow control module that, upon receiving packets from the network, directs one or more of the packets to the security plane for application of the security services, wherein the security plane processes the packets received from the forwarding plane to generate one or more commands, and wherein the security plane outputs the one or more commands to the forwarding plane directing the forwarding plane to dynamically install at least one filter within the forwarding plane to dynamically configure the flow control module for processing packets subsequently received from the network.

22. A method comprising:

receiving packets at a plurality of interfaces of a network router, wherein the plurality of interfaces are configured to send and receive packets;

maintaining routing information specifying routes through a network by executing a routing protocol on a control unit of a routing engine of the router;

selecting next hops for the packets within the network with a forwarding plane configured by the routing engine;

forwarding the packets to the interfaces in accordance with the routing information;

applying security services to the packets with a security plane of the network router;

directing, by a flow control module of the forwarding plane, one or more of the received packets to the security plane for application of the security services;

by the security plane, processing the packets received from the forwarding plane to generate one or more commands; and outputting the one or more commands by the security plane to the forwarding plane directing the forwarding plane to dynamically install at least one filter within the forwarding plane to dynamically configure the flow control module for processing packets subsequently received from the network.

\* \* \* \* \*